(12) United States Patent
Termeer

(10) Patent No.: US 9,993,994 B1
(45) Date of Patent: Jun. 12, 2018

(54) APPARATUS AND METHOD TO CONCEAL DAMAGE ON A VEHICLE

(71) Applicant: Dennis R. Termeer, Lancaster, CA (US)

(72) Inventor: Dennis R. Termeer, Lancaster, CA (US)

( * ) Notice: Subject to any disclaimer, the term of this patent is extended or adjusted under 35 U.S.C. 154(b) by 0 days. days.

(21) Appl. No.: 14/809,105

(22) Filed: Jul. 24, 2015

(51) Int. Cl.
*B32B 3/00* (2006.01)
*B32B 7/06* (2006.01)

(52) U.S. Cl.
CPC ........ *B32B 7/06* (2013.01); *B32B 2307/4023* (2013.01); *B32B 2405/00* (2013.01); *B32B 2451/00* (2013.01); *B32B 2605/08* (2013.01)

(58) Field of Classification Search
CPC .............. B32B 7/12; B32B 2307/4023; B32B 2405/00; B32B 2451/00; B32B 2605/08
See application file for complete search history.

(56) References Cited

U.S. PATENT DOCUMENTS

| | | |
|---|---|---|
| 5,254,192 A | 10/1993 | Speakman |
| 5,271,999 A | 12/1993 | Short |
| 6,921,729 B2 | 7/2005 | Schwab et al. |
| 7,595,104 B2 | 9/2009 | Romanowski |
| 8,227,065 B2 | 7/2012 | Keener et al. |
| 2008/0251201 A1 | 10/2008 | Sikkel et al. |
| 2011/0177331 A1 | 7/2011 | Mosher |

FOREIGN PATENT DOCUMENTS

CN 103857764 A 6/2014

OTHER PUBLICATIONS

ISC Racers Tape, website http://www.racerstape.com/rtp.html. Aug. 29, 2014.
Racer Parts Wholesale, website http://www.racerpartswholesale.com/product/ISC-X-Flex-Crash-Tape/NewRacingProducts#reviews. Aug. 29, 2014.

*Primary Examiner* — Elizabeth Evans Mulvaney
(74) *Attorney, Agent, or Firm* — IP Law World; Eric Kohli, Esq.

(57) ABSTRACT

An apparatus to be affixed to a vehicle to conceal a damaged portion of the vehicle where the apparatus has an exterior surface with a color base coat of paint covered with a clear coat finish, which color base coat of paint exactly matches the color base coat of paint on the vehicle and the clear covering serves to further match the color of the paint on the vehicle which in turn has a clear coat covering. The invention serves to conceal minor damage to the vehicle until the damage such as a ding, dent, scratch etc can be repaired.

8 Claims, 3 Drawing Sheets

APPARATUS AND METHOD TO CONCEAL DAMAGE ON A VEHICLE

BACKGROUND OF THE INVENTION

1. Field of the Invention

The present invention relates to the field of concealing minor damage to a vehicle which results from various problems such as a minor vehicle accident, an individual inadvertently backing into a structure or inadvertently scratching the side of a vehicle when attempting to move the vehicle, vandalism and weather. The present invention relates to the field of concealing the minor damage until the minor damage to the vehicle can be repaired.

2. Description of the Prior Art

The following eight patents and published patent applications are the closest prior art known to the inventor:
1. U.S. Pat. No. 5,254,192 issued to Thomas P. Speakman on Oct. 19, 1993 for "Process for Matching Color of Paints on Vehicles" (hereafter the "Speakman Patent");
2. U.S. Pat. No. 5,271,999 issued to Clifford R. Short on Dec. 21, 1993 for "Duct Tape Having A Non-Depositing Adhesive" (hereafter the "Short Patent");
3. U.S. Pat. No. 6,921,729 issued to Jeffrey J. Schwab et al. on Jul. 26, 2005 for "Adhesive Tape" (hereafter the "Schwab Patent");
4. United States Published Patent Application No. 2008/0251201 to Bernardus J. Sikkel et al. on Oct. 16, 2008 for "Adhesive Tape for Structural Bonding" (hereafter the "Sikkel Published Patent Application");
5. U.S. Pat. No. 7,595,104 issued to John Roamowski on Sep. 29, 2009 for "NBC Barrier Adhesive Tape Structure" (hereafter the "Roamowski Patent");
6. United States Published Patent Application No. 2011/0177331 to Wayne Charles Mosher on Jul. 21, 2011 for "Self-Adhesive Repair Patch" (hereafter the "Mosher Published Patent Application");
7. U.S. Pat. No. 8,227,065 issued to Phillip R. Keener et al. on Jul. 24, 2012 for "Adhesive Tape" (hereafter the "Keener Patent");
8. Chinese Patent No. CN103857764A to LG Hausys on Jun. 11, 2014 for "Adhesive Tape for Automobile" (hereafter the "Hausys Chinese Patent").

The Speakman Patent discloses the invention as follows: "A process for obtaining an exact color match for a repair of a painted surface of a vehicle which uses the following steps: (1) a coating of a paint is applied to the top surface of a flexible plastic substrate that is coated on its back with a pressure sensitive adhesive layer, (2) a coating of the same paint is applied to the exterior of a vehicle to provide a painted surface, steps (1) and (2) can be performed in either order or simultaneously using the same application method such as spraying, (3) each of the coatings of paint are dried under the same or very similar conditions, (4) a damaged area of the painted surface of the vehicle is repaired by adhering a suitable portion of coated plastic substrate prepared in step (1) to the damaged area thereby obtaining an exact color match of the painted plastic substrate and the painted surface of the vehicle."

The Short Patent deals with different types of duct tape and their adhesive strength. The concept is that the duct tape in this patent can be left on a surface on which it is applied and will not leave a residue of the adhesive portion of the duct tape after it is removed. The duct tape can be any color but it is most commonly silver in color.

The Schwab Patent discloses adhesive tape, namely a unique type of duct tape.

The Sikkel Published Patent Application discloses tape with bonding features on each side so that the structural tape can bond two separate pieces together with the adhesive layer on either side of the tape.

The Romanowski Patent discloses:
"An NBC barrier adhesive tape structure useful for the repairing, sealing and the reinforcement of NBC barrier materials used for protecting military personnel, equipment, supplies from nuclear, chemical and/or biological agents, and the like, comprising an NBC barrier film of a multilayer structure laminated with a fabric to provide a desirable adhesive tape that provides resistance to nuclear, chemical and/or biological agents and possesses favorable flexibility properties and is printable."

In this invention, the tape is used for various structural purposes but part of the object of the invention was that the tape be clear so you could not see it against the remainder of the color.

The Mosher Published Patent Application discloses the concept of have parts bonded together with tape.

The Keener Patent discloses an adhesive tape that are well-suited for gaffer uses and are hand tearable in the cross-web and in the web direction.

The Chinese Patent is for pressure sensitive adhesive tape for automobiles.

Also, the inventor is aware of the websites:
http://www.racerstape.com/rtp.html. The company is called ISC Racers Tape and it clearly shows colored tapes in various colors including neon bright tape this is intended as a tape for providing a marker or signal to someone such as a bicyclist by placing it on the appropriate portion of the bicycle frame so that people will know that the rider is there in the darkness.

The second website is http://www.racerpartswholesale.com/product/ISC-X-Flex-Crash-Tape/NewRacinProducts#reviews. The company is Racer Parts Wholesale. The purpose is to have a quick repair during a race so the individual can continue the race and not be concerned about having the color match the color of the car.

While the prior art discloses various methods and apparatus for actually repairing the damage on a vehicle, the prior art does not disclose having a temporary concealing apparatus which hides the damage so that it is not visible even on close inspection.

SUMMARY OF THE INVENTION

The present invention relates to the field of concealing minor damage to a vehicle so that the minor damage is not noticeable until the damage can be repaired. Frequently, damages occur because of an accident, vandalism, weather, door dings, rock chips, scratches and normal wear. Therefore, it is the preference of such individuals to conceal the damage on the vehicle.

The object of the present invention is to create an apparatus which can be adhered to the surface area of the vehicle which has been damaged and have a paint color which matches the paint color of the vehicle so that the damage is not noticeable.

It is a key object of the present invention to provide an apparatus having an adhesive surface which is of sufficient strength to be able to be retained on a vehicle even when the vehicle goes through inclement weather such as rain or snow and on the opposite surface, have a pro-prepared surface to which a color base coat of paint has been applied and an overlying clear coat is also applied. The coloring matches the color of the vehicle including the clear coat to provide additional duplication to have the present invention accurately match the color of the vehicle as closely as possible.

While there are numerous different colors of vehicles, it has been determined by the present inventor that there are primarily, but not limited to one hundred basic colors that are used with the vast majority of vehicles that are generally used by consumers. Various shades of the color spectrum, different metallics, as well as tri coat applications are included. While other colors are also used on certain vehicles, for the purposes of determining consumer acceptance, the present invention will create a specific inventory of a certain number of apparatus which have basic vehicle car colors to match the color of the vehicle. The most common vehicles to which the present invention will be applied are consumer automobiles, sedans, coupes, trucks, SUV's and motorcycles are all candidates for the present invention. A clear coat will be applied over each respective base color of paint on the present invention sheet of material.

It is therefore an object of the present invention to create an apparatus having one side having an adhesive which can be removably affixed to the surface of a vehicle but has sufficient adhesion to be retained on the surface of the vehicle at the location of a damaged area where the adhesive strength is sufficient to enable the apparatus to be retained on the vehicle even if the vehicle undergoes inclement wear or weather such as rain or snow.

It is a further object of the present invention to have an apparatus which has a second surface to which a base coat coloring and clear coat are applied primarily by painting, then baked in a similar condition the automobile original paint was baked in (90-180 degrees Fahrenheit). The method includes other numerous methods selected from the group consisting of printing, inkjet printing, laser printing, spray painting, and any other coloring methods to apply a color to the exterior surface of the apparatus which can be affixed over the location of the damage to conceal the damage and where the exterior coloring as close as possible matches the paint color of the damaged vehicle so that the damage is concealed by the present invention apparatus.

It is a further object to use commercially available products, primarily vinyl with adhesive backing. It is within the spirit and scope of the present invention for the material out of which the present invention is made to be selected from the group consisting of vinyl, masking tape, duct tape, painting tape, all of which include sufficient adhesive strength to be able to be retained on a vehicle at a location of the damage on one side of the material and have the opposite side of the material able to absorb color primarily through sprayed paint application or any one of the selected methods identified above or any additional methods so that the color and the overlapping clear coat is permanently affixed to the outer surface of the apparatus.

It is the intent to have the color as closely as possible match the color of the vehicle so that the damage is not noticeable and can remain in place for a period of time such as several days or several weeks until the damage can be repaired.

Where the vehicle has sustained substantial damage such as a part having broken off or substantially dented such as a fender or bumper, the present invention is not intended as an apparatus to physically retain a part to a vehicle as that would require substantial liability to be sure that the apparatus sufficiently retained the component that was damaged to the vehicle and so that the retention would be sufficient to avoid having the component inadvertently fall off the vehicle and possibly cause an accident.

The object of the present invention is strictly and solely to conceal a damaged portion of the vehicle by an apparatus which on one side has adhesive to be retained to a vehicle and on the opposite side, has a surface to which color and clear coat have been applied and retained and which color matches the exterior color of the vehicle so that the damage is virtually unnoticeable.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

| PARTS LIST | |
|---|---|
| PART NUMBER | PART NAME |
| 100 | vehicle |
| 110 | vehicle body |
| 120 | tire |
| 122 | tire |
| 130 | vehicle side door |
| 150 | base coat color of vehicle |
| 152 | clear coat color on top of base coat |
| 140 | dent in vehicle |
| 160 | scratch in vehicle |
| 10 | present invention strip |
| 20 | top surface of present invention |
| 30 | color base coat of paint on top surface |

-continued

PARTS LIST

| PART NUMBER | PART NAME |
| --- | --- |
| 40 | clear coat covering on color base coat |
| 50 | lower surface of present invention 10 |
| 60 | adhesive affixed to lower surface |
| 70 | peal away protective shield on lower surface |

Figure 1:
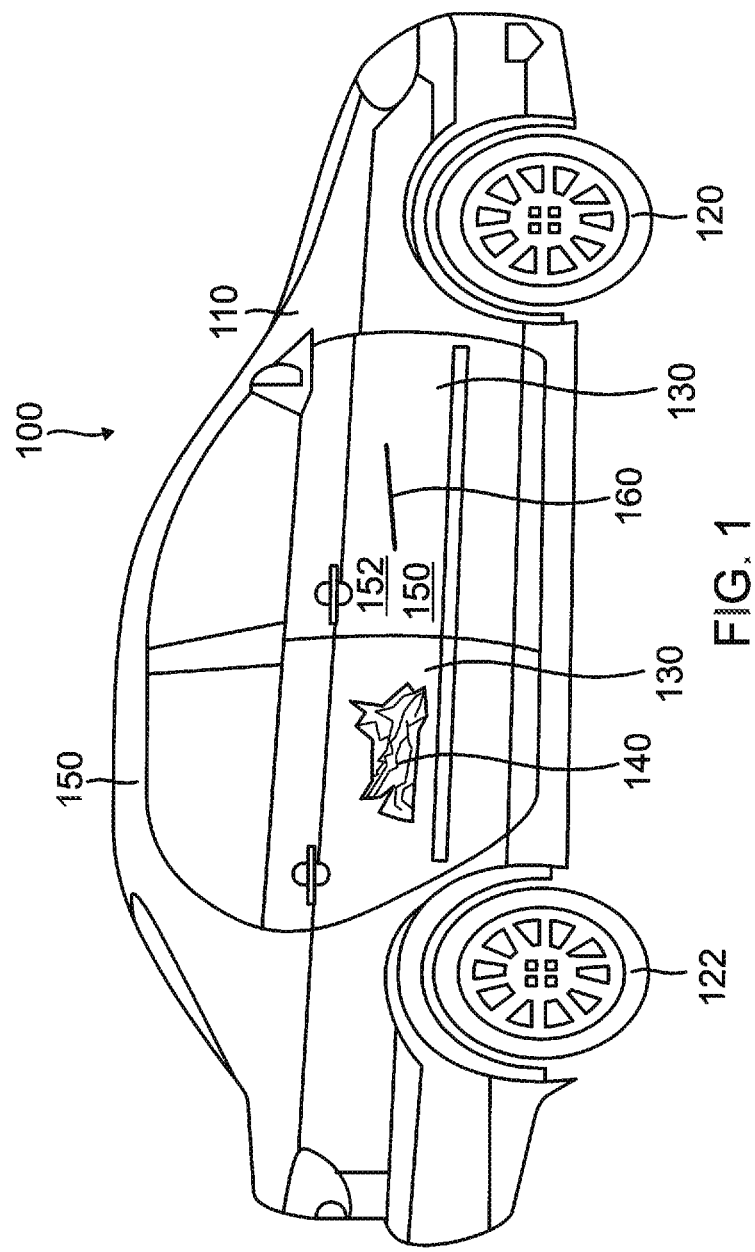
FIG. 1 is a side view of a small vehicle which has a specific base coat color and clear coat finish of paint on it and also has a deep scratch in its side as the damage to the vehicle.

Referring to FIG. 1, there is a side view of a vehicle 100 with standard components being illustrated. Specifically, the vehicle 100 has a body 110 with a side door 130 and a pair of wheels 120 and 122 on the side of the vehicle as viewed in FIG. 1. The vehicle has a specific color base coat of paint 150 and clear coat finish 152 and the vehicle has a damage such as a deep scratch 160, chip, ding, or dent 140. The vehicle can have at least one color paint.

Figure 2:
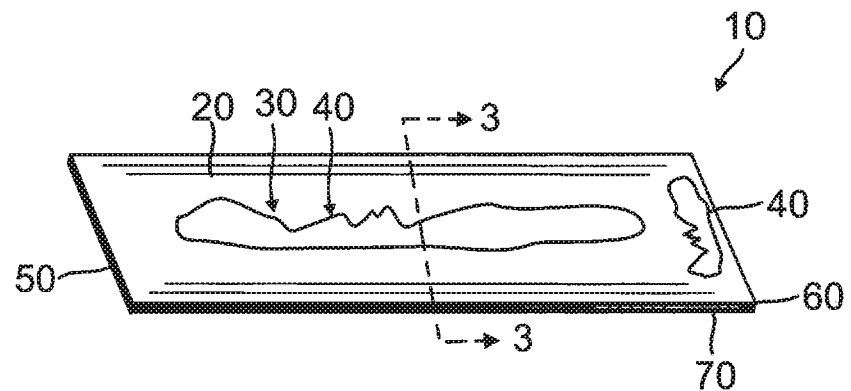
FIG. 2 is a top and side perspective view of the present invention apparatus illustrating the top surface having a particular color base coat color and clear coat finish paint and the bottom of the surface having an adhesive member and protective covering to shield the adhesive member until used.

FIG. 2 is a top perspective view of the present invention apparatus 10 which is removably affixed to a vehicle 100 so that it can be retained on the vehicle 100 without being removed due to ordinary wear, inclement weather conditions such as rain, wind, or snow. The upper surface 20 has a specific color base coat 30 and clear coat finish 40 thereon. The clear coat is to provide an exact match to the clear coat and color of the vehicle being concealed. The upper surface 20 is covered first with the specific color base coat of paint 30 and then a final top layer of clear coat finish 40 to match the color of base color paint 150 and clear coat finish 152 on the vehicle 100, including matching at least one color paint where damage has occurred to the vehicle. The lower surface 50 of the strip 10 is covered with adhesive 60. A protective removable shield 70 covers the adhesive 60 on the lower surface.

Figure 3:
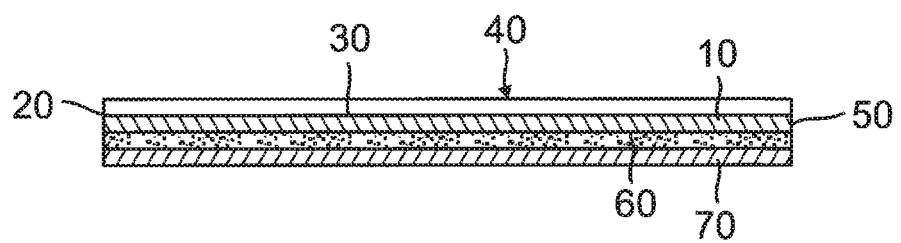
FIG. 3 is a cross-sectional view of the present invention apparatus taken along Line 3-3 of FIG. 2 illustrating the top surface having a particular color base coat color and clear coat finish and the bottom of the surface having an adhesive member and protective covering shield.

FIG. 3 is a cross-sectional view taken along Line 3-3 of FIG. 2 with the layers exaggerated for clearer illustration purposes, illustrating the upper surface 20 and the lower surface is 50. The upper surface 20 is covered first with the specific color base coat of paint 30, lastly coated with clear coat 40 to match the color of base coat of paint 150 and the clear coat 152 on the vehicle 100, including matching the at least one color base coat and clear coat finish where damage has occurred to the vehicle. The lower surface 50 is covered with adhesive 60. A protective removable shield 70 covers the adhesive 50 on the lower surface.

By way of example, the present apparatus 10 will primarily be made material selected from the group consisting of vinyl, masking tape, duct tape, painting tape, each of which may or may not already come with adhesive 60 on its lower surface 50. The adhesive 60 is of specific consistency and adhesive strength depending upon the specific material used. The key factor is that the adhesive 60 must be of sufficient adhesive strength so that it will adhere to the body 110 of the vehicle 100 at the location of the damage dent 140 or scratch 160 so that it will not come off under normal wear, inclement weather or of there are any other outside elements which would cause a strip with adhesive on one side by which it is affixed to the body of the vehicle to become loosened and fall away.

While it is true that vehicles come in an infinite variety of colors, it has been discovered that there are approximately one hundred primary colors that are used on most vehicles which contain various shades of the color spectrum, different metallic's, as well as tri coat applications are included. While other colors are also used on certain vehicles, for the purposes of general application initially, the present invention will create a specific inventory of a certain number of apparatus which have basic vehicle car colors to match the color of the vehicle.

The intent of the present invention is to select what is considered to be the most common one hundred colors that are used and to have a paint which exactly matches each of those colors. The paint will be mixed using different toners, the same types used by automobile manufactures, and collision repair facilities to match the certain color of paint on a manufactured vehicle per paint code provided on vehicles. The process will be applied to the upper surface 20 primarily by painting, but not limited to any known method which would include, painting, printing, inkjet printing, laser printing and spray painting.

Figure 4:
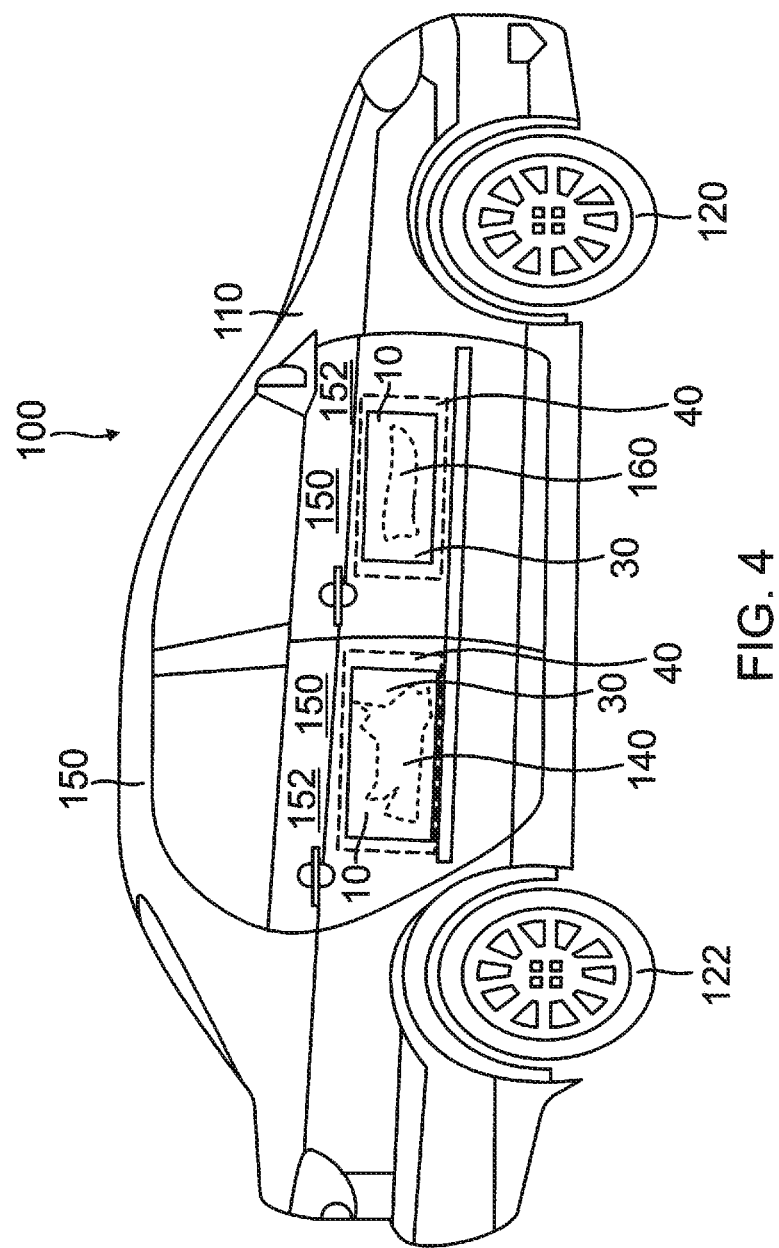
FIG. 4 is a side view of a vehicle with the present invention matching color base coat color and clear coat finish affixed to a vehicle to conceal minor damage on the vehicle.

Referring to FIG. 4 there is illustrated the vehicle with all the same component parts as illustrated in FIG. 1 but now the present invention 10 is concealing the damaged portions 140 and 160 with the apparatus 10 which primarily will be vinyl with the color base coat 30 and clear coat finish top layer 40 exactly matching the color base coat and clear coat finish 150 of the vehicle 100 so that the present invention covers the damage in a manner so that the damage is not noticeable since the exterior color base coat and clear coat finish of the present invention is the same as the color of the vehicle. The removable protective shield 70 has been removed and the apparatus 10 is applied so that the adhesive 60 affixes the apparatus 10 to the vehicle 100. Each damage 140 and 160 is of a first given size and shape and the apparatus 10 is of a given size and shape at least the same size and shape as the damages or larger than the damages.

The present invention can be primarily made of vinyl with adhesive backing but not limited to the form of tapes, can be in the form of square or rectangular strips, circles, shapes etc. and can be in any other form and can be sold in various sizes to cover various amounts of damage to be concealed by the present invention. Also to be sold in sections that can be cut, or torn off.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus to conceal damage on an exterior surface of a vehicle, said exterior surface of the vehicle having paint applied on it and baked, said apparatus comprising:
   a sheet of material, said sheet having an upper surface and a lower surface;
   an adhesive material applied to said lower surface of said sheet; and
   a paint material applied to said upper surface of said sheet and baked; wherein
   said upper surface of the sheet of material is able to absorb said paint material,
   said paint material on said upper surface of the sheet of material is baked at a similar temperature as said paint applied on said exterior surface of the vehicle, and said paint material on said upper surface of the sheet of material is baked at a temperature between 105° F. and 180° F.

2. The apparatus of claim 1, wherein said sheet of material is made from a material selected from the group consisting of vinyl, masking tape, duct tape, and painting tape.

3. The apparatus of claim 1, wherein
   said paint material is applied to said upper surface of the sheet of material by spray painting, inkjet printing, or laser printing, and
   said adhesive material has a bonding strength sufficient to keep said sheet of material adhered to said exterior surface of the vehicle during inclement weather.

4. A method of concealing a damaged area on an exterior surface of a vehicle, comprising:
   applying a paint material to a sheet of material, said sheet of material able to absorb said paint material;
   baking said paint material on said sheet of material at a temperature between 105° F. and 180° F.; and
   adhering said sheet of material with an adhesive material to said damaged area on the exterior surface of the vehicle.

5. The method of claim 4, further comprising the steps of:
   applying paint to said exterior surface of the vehicle; and
   baking said paint on said exterior surface of the vehicle at a temperature similar to the temperature at which said paint material on the sheet of material is baked, wherein
   said paint material has a color,
   said paint on said exterior surface of the vehicle has a color, and
   the color of said paint material is similar to the color of said paint on said exterior surface of the vehicle.

6. The method of claim 4 or 5, further comprising the steps of:
   preparing a surface of said sheet of material prior to applying said paint material; and
   applying said paint material to said prepared surface of said sheet of material by spray painting, inkjet printing, or laser printing, wherein
   said sheet of material is made from a material selected from the group consisting of vinyl, masking tape, duct tape, and painting tape; and
   said adhesive material has a bonding strength sufficient to keep said sheet of material adhered to said damaged area on said exterior surface of the vehicle during inclement weather.

7. An apparatus to conceal a damaged area on an exterior surface of a vehicle, comprising:
   a layer of absorbent material having an upper side and a lower side, said absorbent material being able to absorb paint;
   a layer of adhesive material on said lower side of the absorbent material; and
   a layer of paint on said upper side of the absorbent material, wherein:
   said layer of paint is applied on said absorbent material by spray painting, inkjet printing, or laser printing and baked at a temperature between 105° F. and 180° F.;
   said absorbent material is made from a material selected from the group consisting of vinyl, masking tape, duct tape, and painting tape; and
   said adhesive material has a bonding strength sufficient to keep said sheet of material adhered to said damaged area on the exterior surface of the vehicle during inclement weather.

8. The apparatus of claim 7, further comprising:
   a layer of clear coat on said layer of paint; and
   a protective layer of material on said layer of adhesive material.

* * * * *